Dec. 16, 1930. W. C. BLACK 1,785,574
COAL CUTTING MACHINE AND THE LIKE
Filed May 2, 1928 2 Sheets-Sheet 2

INVENTOR
WILLIAM CHRISTIE BLACK
by
ATTORNEY.

Patented Dec. 16, 1930

1,785,574

UNITED STATES PATENT OFFICE

WILLIAM CHRISTIE BLACK, OF DUDLEY, ENGLAND, ASSIGNOR TO MATTHEW SMITH MOORE, OF BRUSSELS, BELGIUM

COAL-CUTTING MACHINE AND THE LIKE

Application filed May 2, 1928, Serial No. 274,437, and in Belgium May 12, 1927.

This invention has reference to coal cutting machines and the like and it has for its chief object to provide a gear head structure that will enable a cutting machine of the bar type to be easily converted into a machine of the chain type and vice versa. A further object is to provide for an efficient lubrication of the gears while dispensing with the cumbersome oil boxes which had to be affixed to the so called "banjo" or head portion of the cutter bar mechanism when inverted to cut above the pavement.

In coal cutting machines the gear head comprises a casing containing the gears for reducing the high speed of the electric or compressed air motors down to the speed suitable for driving the cutting members either of the bar or chain type. It is well known that in chain machines the cutting members have to be driven at a much lower speed than in bar machines. Considerable inconvenience is experienced when it is desired to change the machine from one type to the other as the gear head has to be entirely or at least partly taken to pieces, the parts are heavy and difficult to handle, particularly in the confined spaces underground, and the interchange always entails a great loss of time.

According to my present invention the gear head is so constructed that the machine may be changed from the bar type to the chain type or conversely by the mere substitution of parts external to the gear head casing. To this end the vertical shaft for transmitting the driving motion from the motor to the cutting members is permanently mounted in a rotatable support seated at its periphery on the base of the gear casing, and to this support is detachably secured the banjo of the cutter bar or the head of the chain jib as the case may be. The lower end of the vertical shaft projects below its external support and is adapted to engage a bevel wheel for rotating the bar or a sprocket wheel for driving the chain, so that these wheels and the bar and chain mechanism are the only parts that have to be interchanged. The gear head itself reqires no change or adjustment and the proper speed is imparted thereto by controlling its driving shaft by means of a change speed gear as described and claimed in my co-pending patent application Ser. No. 153,643, filed 9th December, 1926, which gear then is so arranged that one speed ratio will suit bar cutters and another chain cutters.

The support for the vertical shaft preferably has a flat base forming a fluid-tight partition closing up the bottom opening of the gear head casing so that when the banjo of the bar mechanism is secured in position under this base, it is sealed off from the gear head casing in immediate proximity to the gears in the banjo.

This is of particular advantage when the machine, or the gear head, is inverted in order that the bar may cut at a certain height above floor level. Heretofore it was found necessary to affix oil boxes to the outside surface of the banjo to lubricate the cutter bar bearings and these boxes limited the height to which the machine could be raised near the roof. By means of the construction according to the invention, oil placed in the banjo is retained at the desired level and external oil boxes are dispensed with.

In the accompanying drawing illustrating by way of example a gear head embodying my present invention:

Figure 1:
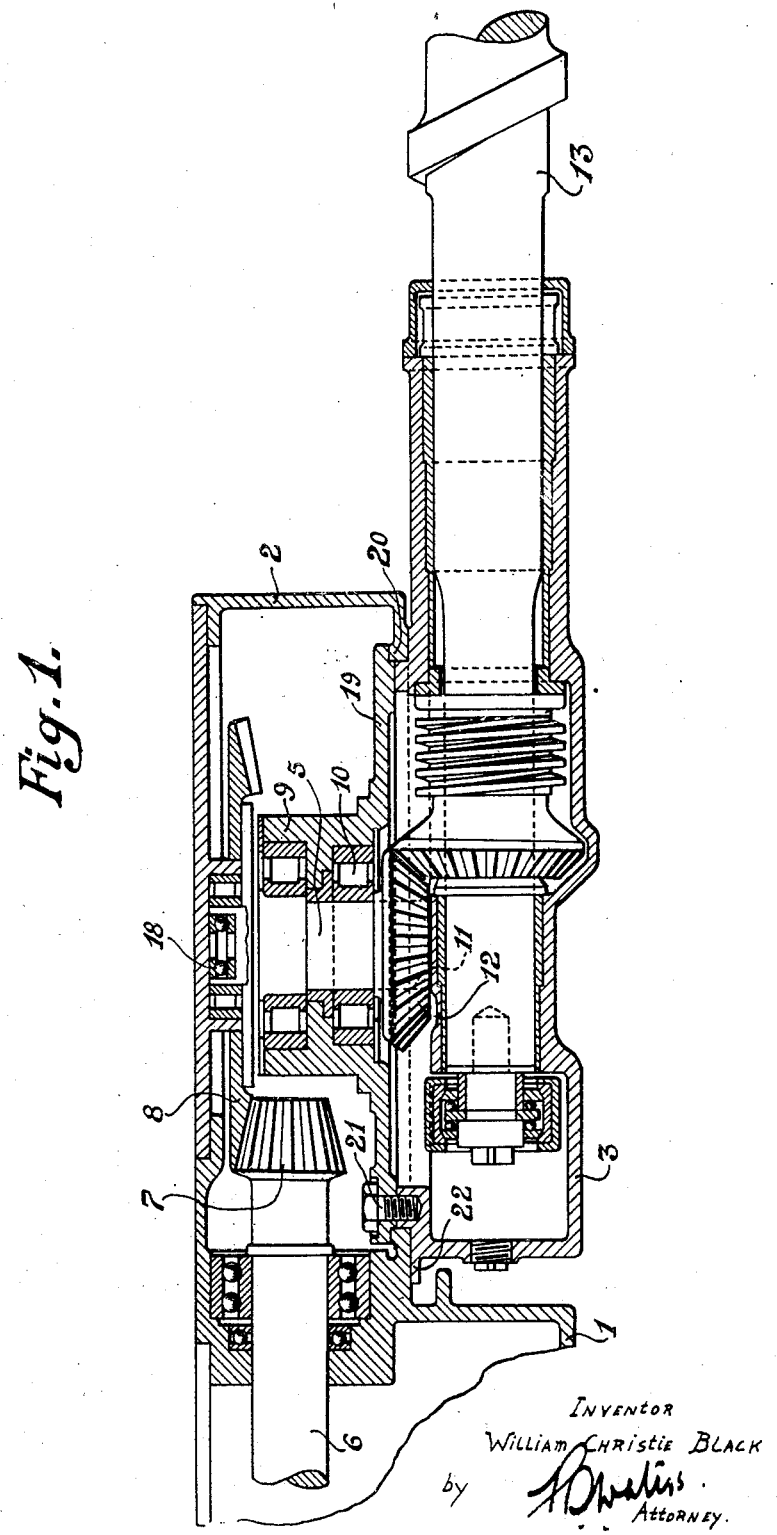
Fig. 1 shows in vertical section the gear head fitted with a bar mechanism.
Figure 2:
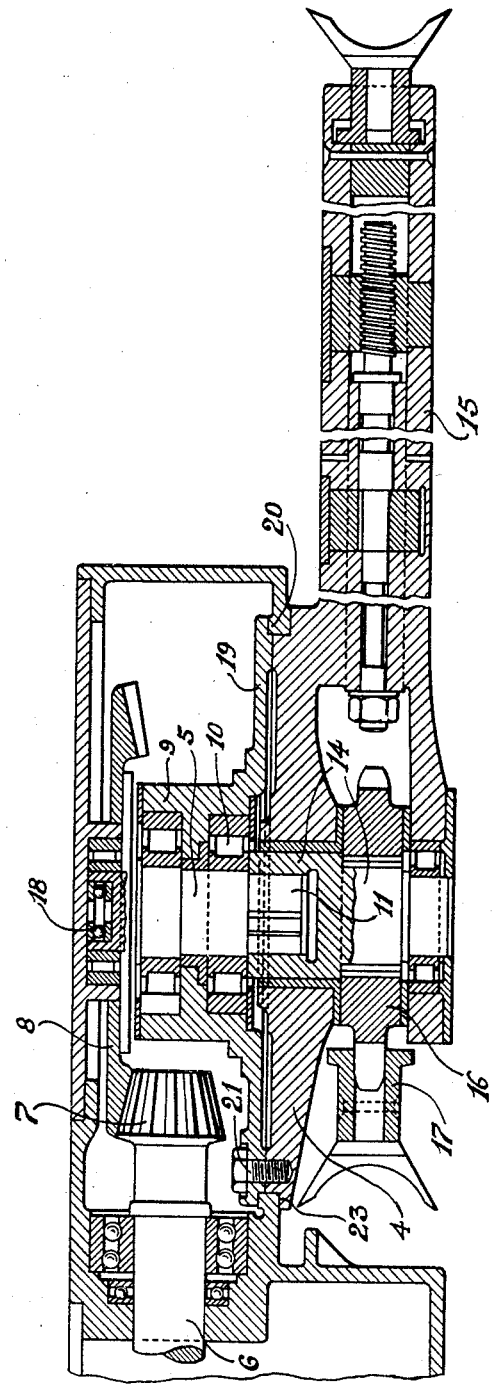
Fig. 2 is a similar view of the same gear head with a chain mechanism.

In the drawing, 1 is the machine frame or body, 2 the gear head casing rigid therewith, 3 the banjo or casing of the bar mechanism (Fig. 1) and 4 the head of the chain mechanism (Fig. 2). 5 is the vertical shaft which is rotated from the driving shaft 6 by means of the pinion 7 and bevel wheel 8.

As shown the vertical shaft 5 is permanently supported in an external support 9 preferably provided with roller bearings 10, and it has a splined lower end 11 on which may be fitted at will a pinion 12 (Fig. 1) for rotating the bar 13, or a hollow shaft 14 (Fig. 2) mounted in the head 4 of the jib 15 and carrying a sprocket wheel 16 for driving the chain 17 in a well known manner. A ball bearing 18 may be provided between the upper end of the shaft 5 and the top wall of the casing 2 to take up the thrust of said shaft.

The support 9 has a flat base 19 resting at its periphery on an annular seat 20 in the base of the casing 2. To this base 19, which is capable of rotating on its seat when required, can be secured by means of screws 21 or otherwise, the banjo 3 or the jib head 4, as the case may be.

In order to impart to the shaft 5 the required rate of motion for rotating the bar or the chain at the proper speed the shaft 6 is driven by the motor through the medium of a change speed gear as disclosed in my said application Ser. No. 153,643, in which the gears can easily be dimensioned so as to give the speed ratio suitable for each case.

It will readily be understood that with the arrangement above described the interchange from one type of machine to the other can be performed with great ease and in very little time, since it involves only the substitution of the jib for the banjo or vice versa and the parts of the gear head required neither change nor adjustment.

Normally the machine operates on the floor of the seam with the cutter members cutting at floor level, but under certain conditions it is necessary to cut well above floor level, for instance in a dirt band, and in order to maintain the stability of the machine and to keep the weight as low as possible, the machine or at least the gear head is turned upside down so that the cutter members are approximately in line with the top of the machine.

In machines of the bar type, however, the height to which the bar could be raised near the roof was limited by the necessity of providing oil boxes on the outside of the banjo in order properly to lubricate the cutter bar bearings. The present invention affords a convenient means of avoiding this inconvenience, by shaping the base portion 19 of the support 9 as a disc-shaped partition having a fluid-tight joint with its seat 20. When the gear head is inverted the weight of the support 9 and shaft 5 rests on the bearing 18 and the contacting surfaces of the partition 19 and seat 20 remain in fluid-tight engagement, while the weight of the banjo or jib is taken up by a lip 22 or 23 provided thereon in a well known manner. Oil introduced into the banjo 3 then will be retained therein so that the lubrication of the cutter bar bearings is secured without the assistance of external oil boxes.

It will be understood that the term "cutting mechanism" used in the appended claims applies to any construction of bar or chain cutting mechanisms and that the particular structure shown may be varied in its details without departing from the scope of the appended claims.

I claim:

1. In a coal cutting machine, the combination of a gear head having a vertical shaft, a casing therefor, a cutting mechanism, a carrier rotatably seated in said casing, said carrier forming a permanent bearing for said shaft, and means for detachably securing said mechanism to said carrier.

2. In a machine for coal cutting and the like, the combination of a gear head comprising a vertical shaft and a gear for actuating said shaft, a gear head casing having an open base, a support for said shaft permanently seated on said base, said support being rotatable on said base, a cutting mechanism, and means for detachably securing said mechanism to said support.

3. In a machine for coal cutting and the like, the combination of a gear head comprising a vertical shaft and a gear for actuating said shaft, a gear casing having an annular seat surrounding an opening, and a member rotatably mounted in said casing, said member having a tubular portion surrounding said shaft and a disc-shaped portion engaging said seat, a cutting mechanism, and means for detachably securing said mechanism to the disc-shaped portion of said member.

4. In a machine for coal cutting and the like, the combination with a gear head casing having a circular opening, of a vertical shaft projecting through said opening and a support for said shaft comprising a tubular portion surrounding said shaft and an annular flange rotatably seated on the edge of said opening, a cutting mechanism adapted to be operated from said shaft, and means for detachably securing said mechanism to said annular flange.

5. In a machine for coal cutting and the like, the combination of a gear head comprising a vertical shaft and a gear for actuating said shaft, a gear head casing having an opening, and a support for said shaft rotatably seated on the edge of said opening and having a fluid-tight engagement therewith, a cutting mechanism, a removable operative connection between said shaft and said mechanism, said connection being external to said casing, and means for detachably securing said mechanism to said support.

6. In a machine for coal cutting and the like, the combination of a gear head comprising a vertical shaft and a gear for rotating said shaft, a gear head casing having an annular seat surrounding an opening, a member resting on said seat, said member being rotatable in said casing, said shaft extending through said member and through said opening, cutting mechanism adapted to be directly secured to said member, and removable means on the outer end of said shaft for driving said cutting mechanism.

7. In a coal cutting machine, the combination of a gear head having a vertical shaft, a casing therefor, and means for enabling said machine to be converted from the bar to the chain type and conversely comprising a hollow member rotatably seated in said casing and forming a permanent bearing for said shaft, means for detachably securing a cutting mechanism to said member and removable means external to said casing for providing an operative connection between said shaft and said cutting mechanism.

WILLIAM CHRISTIE BLACK.